United States Patent [19]

Zantinge et al.

[11] Patent Number: 5,133,575
[45] Date of Patent: Jul. 28, 1992

[54] VEHICLE WITH AXLE SUSPENSION DEVICE WITH GAS SPRING SUSPENSION AND CONTROL SYSTEM THEREFOR

[75] Inventors: Johan M. Zantinge, Rheden; Derk G. Aalderink, Laren, both of Netherlands

[73] Assignee: Weweler N.V., Apeldoorn, Netherlands

[21] Appl. No.: 619,000

[22] Filed: Nov. 28, 1990

[30] Foreign Application Priority Data

Dec. 1, 1989 [NL] Netherlands ................ 8902974

[51] Int. Cl.$^5$ ............................................ B60G 11/26
[52] U.S. Cl. .................................. 280/708; 280/711; 280/714
[58] Field of Search ............ 280/708, 711, 714, 689

[56] References Cited

U.S. PATENT DOCUMENTS 3,912,303 10/1975 Thate et al. .................... 280/708
4,619,467 10/1986 Lafferty ........................ 280/708

FOREIGN PATENT DOCUMENTS

| | | |
|---|---|---|
| 0118608 | 9/1984 | European Pat. Off. |
| 0152914 | 8/1985 | European Pat. Off. |
| 1630278 | 5/1971 | Fed. Rep. of Germany |
| 2407161 | 8/1975 | Fed. Rep. of Germany |
| 2627665 | 12/1977 | Fed. Rep. of Germany |
| 775996 | 1/1935 | France |
| 2196921 | 3/1974 | France |
| 2300689 | 9/1976 | France |
| 366754 | 2/1963 | Switzerland |

Primary Examiner—Kenneth R. Rice
Attorney, Agent, or Firm—Young & Thompson

[57] ABSTRACT

In an axle suspension device for a vehicle with gas spring suspension and roll stabilization an essentially rigid stabilizer body is used which is hingedly connected in two points to the axle to be stabilized, each near one end thereof, and in two points to the vehicle frame, which latter connections are formed by substantially vertical hydraulic cylinders with piston rods, having a sliding bearing in the cylinders, which can absorb transverse forces, the cylinders or piston rods thereof being connected to the frame by rigid connections.

A control system for such cylinders has a pressure transformer with a larger surface, which is directly or indirectly under the pressure of the gas in the gas spring system, and has a smaller surface, on which the hydraulic pressure in said cylinders acts in the opposite direction, said surfaces being connected for common movement, a control pressure exerted by a fluid acting on the other side of said larger surface in the same direction as said hydraulic pressure being variable to control this system depending on one or more parameters on the basis of driving or road conditions.

All this allows a simple and reliable design, safety and adaptation of roll stabilizing to different conditions for maximum comfort.

13 Claims, 3 Drawing Sheets

VEHICLE WITH AXLE SUSPENSION DEVICE WITH GAS SPRING SUSPENSION AND CONTROL SYSTEM THEREFOR

The invention relates to an axle suspension device for a vehicle with gas spring suspension and a roll stabilizer, to a vehicle with such a device, and to a control system for spring suspension, shock absorption and stabilization.

In known devices of this type the stabilizer body may be more or less rigid against torsion and there may be mechanic or pneumatic springs or hydraulic cylinders in one or more connections of the stabilizer body to the frame or to the axle or between parts of the stabilizer body itself.

The object of the invention is in the first place to provide such a device which is simple in design and in particular has a minimum of pivoted joints, and which through advantageous arrangement of the parts and design of the control system gives ideal roll stabilization which is easy to adapt to all kinds of desired parameters, so that with maximum driving comfort in widely varying conditions the angle of roll can be kept small, together with a high degree of safety and controllability and variability of the roll behaviour, and so that even with great roll suppression sufficient spring facility always remains in the gas spring suspension.

An axle suspension device of the type mentioned is according to the invention designed in such a way that the essentially torsionally rigid stabilizer frame in the two pivot points connected to the frame is connected to substantially vertical hydraulic cylinders or the piston rods thereof, in which near the place where they come out of the cylinders the piston rods run through a sliding bearing in the cylinders, which bearing can absorb transverse forces, and in which the connections to the frame of said cylinders or their piston rods are rigid.

This means a further reduction in the number of pivot points in the system, and it can be carried out easily so that no vertical reactions to braking and propulsion forces occur. The roll centre can be low down, which is advantageous as regards transverse movement and accelerations when following uneven road surfaces. To this end, the stabilizer frame is preferably fitted below the central axis of the axle to be stabilized, while above said axis a reaction rod running in the lengthwise direction of the vehicle is hingedly connected to frame and axle.

A vehicle according to the invention is preferably characterized in that the rigid connections to the frame of said cylinders or their piston rods are fitted against vertical side walls of runners (beams or bars) of the frame.

A control system for such devices, also usable on devices with more pivot points and even on such devices of considerably deviating design of the spring and stabilizer system, but always with gas springs and roll stabilizer element which is connected by means of one or more hydraulic cylinders to frame and/or axle to be stabilized, and having control means for the hydraulic pressure in said cylinder(s) to influence the stabilization rigidity, is according to the invention characterized in that a pressure transformer has two connected active surfaces, a larger surface which is under the pressure of the gas in the gas spring system, and a smaller surface on which the pressure in said hydraulic cylinder(s) acts in the opposite direction, while at the other side of said larger surface a control pressure through a flowing medium acts in the same direction as said hydraulic pressure, which control pressure is under the control of a system which controls said pressure depending on one or more parameters based on driving conditions, road conditions or the like. This gives a simple system with an ideal influencing of the roll behaviour while retaining good ride and spring comfort. In this case the system can behave practically as an independent spring system, for example on bad roads. In the case of transverse accelerations the pressure in the above-mentioned opposite direction can be reduced, if necessary proportionately, to increase the roll rigidity, in which case the angle of roll can easily be suppressed to a value which gives the driver just enough feel of the vehicle behaviour. The system can also be made rigid, for example during tipping or the extension of tipping parts or parts of vehicles which have to be extended a long way.

A central control system can within the scope of the invention also easily influence the shock absorbers depending on load.

The invention will now be explained in greater detail with reference to the appended drawings.

Figure 1:
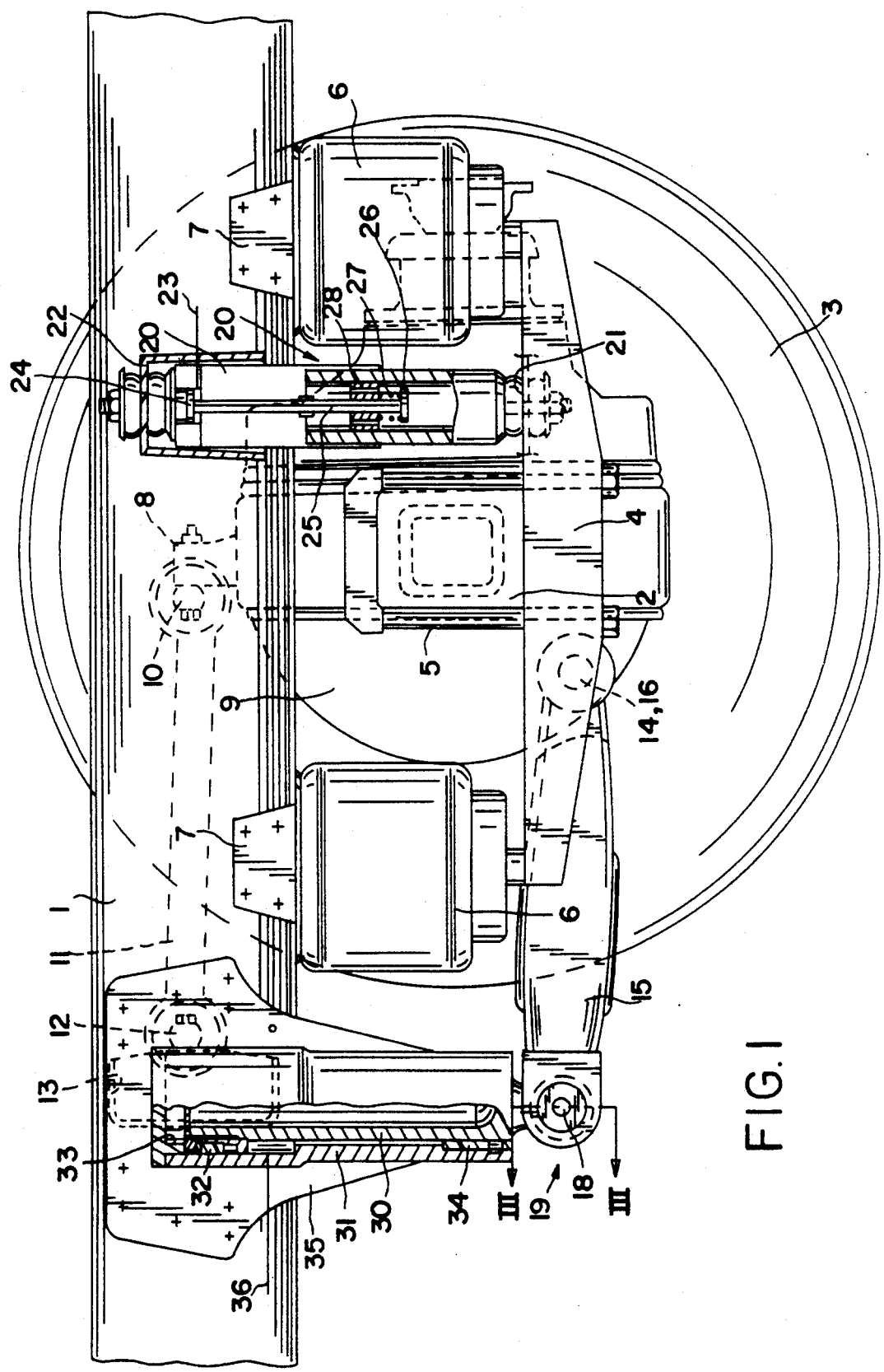
FIG. 1 shows a side view, partially cross-section, of an axle suspension device in a preferred embodiment of the invention, partially in cross-section.
Figure 2:
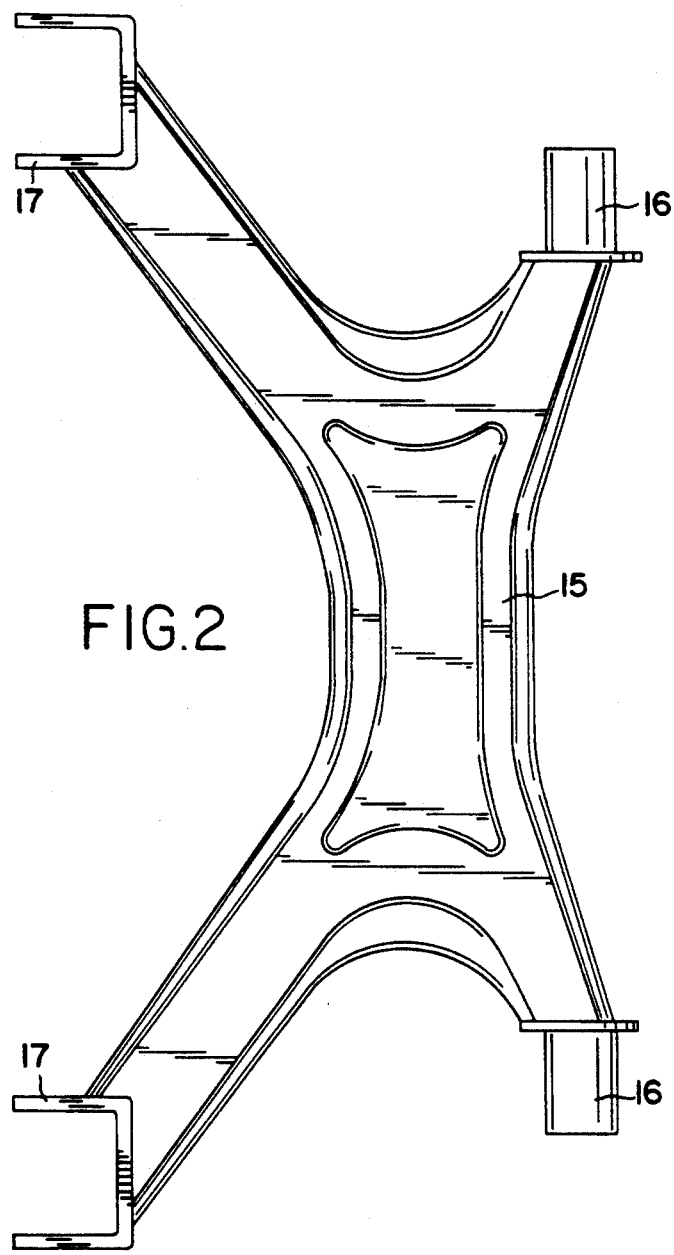
FIG. 2 shows a top view of the stabilizer element used therein.

A vehicle with an axle suspension device according to the invention has two longitudinal frame bars 1 and a tubular axle 2 bearing two or more wheels 3. At each side a yoke 4 with straps 5 is clamped firmly underneath against the axle. Each yoke 4 bears at each end a pneumatic spring bellows 6, which at the other side is supported and fixed underneath against the frame bar 1 (see mounting plates 7). Fitted hingedly at 10 on an elevation 8 on the axle 2, in this case on the housing 9 of a differential gear, is a guide rod 11 which at the other side is hingedly connected at 12 to a transverse bar 13 between the longitudinal bars 1 of the frame. The rod 11 runs in the lengthwise direction of the vehicle in the longitudinal centre plane thereof and, through the design of its pivot points 10 and/or 12, permits sufficient roll between axle and frame.

A hinge bearing 14 is fitted inside each yoke 4 to the side of the axle.

An essentially rigid stabilizer body 15, made of sheet material and in the form of a hollow tubular element, extends approximately horizontally at the level of the yokes 4 and has at the bearings 14 a bearing pin 16 with which it engages in said bearings, so that it can pivot therein only about the central axis of said bearings 14.

Figure 3:
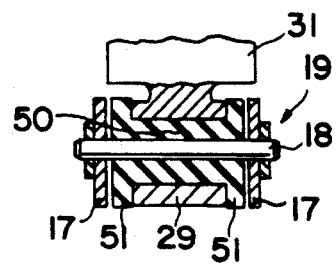
FIG. 3 shows a cross-section along the line III—III in FIG. 2.

Near the other side, said element 15 has two bearing forks 17, each bearing a bearing pin 18 of a bearing 19 (FIG. 3).

A shock absorber 20 is fitted between each yoke 4 and the frame, in such a way that at 21 and 22 it is fixed firmly but to some extent swivellably, on the top of the yoke 4 and at the side to a longitudinal bar 1 of the frame respectively. Said shock absorbers 20 are controllable depending on load, for which purpose it is possible to use commercially available, variably adjustable shock absorbers which influence, for example, the passage resistance of the narrow passages for damping the oil flow through the fact that a flowing medium, for example the air from the pneumatic spring bellows, is admitted through a conduit 23 below a piston 24, connected to a rod 25, which at its other end bears a head 26, pressing on a spring 27 which influences a non-return (check-) valve system with narrow passages in a piston 28 in such a way that at higher pressure below piston 24 the narrow openings in said piston 28 are more closed. All this is shown only partially and schematically in FIG. 1, since these are shock absorbers which are known per se. Such shock absorbers are variable in one or both directions. Such shock absorbers can also be controlled electronically.

Each bearing 19 is fixed with its external bearing bush 29 on the hollow piston rod 30 of a hydraulic cylinder 31. Inside this bush 29 is a rubber bush 50 around bearing pin 18, which bush 50 bears a broad rubber flange 51 at each end in order to permit some lateral movement and tilting between bush 29 and element 15, as is necessary during rolling. A ball hinge with some lateral mobility could also be used here. The piston 32 on the top of this piston rod 30 cooperates with an annular abutment 33 in the top of said cylinder 31 and the piston rod 30 is guided in the bottom of the cylinder by a sealing bearing 34 which can absorb transverse forces. The cylinder 31 is fixed on a mounting plate 35 which supports it firmly up to the bottom end and is fixed firmly against the outside of the adjacent frame bar 1. A duct connection 36 can supply hydraulic control medium to the cylinder 31 below piston 32. In order to prevent the piston 32 from bumping against parts of the cylinder 31 on reaching one or the other end position, a throttling device which is known per se in shock absorbers can become active at each stroke end of said piston (so-called hydraulic buffering).

Figure 4:
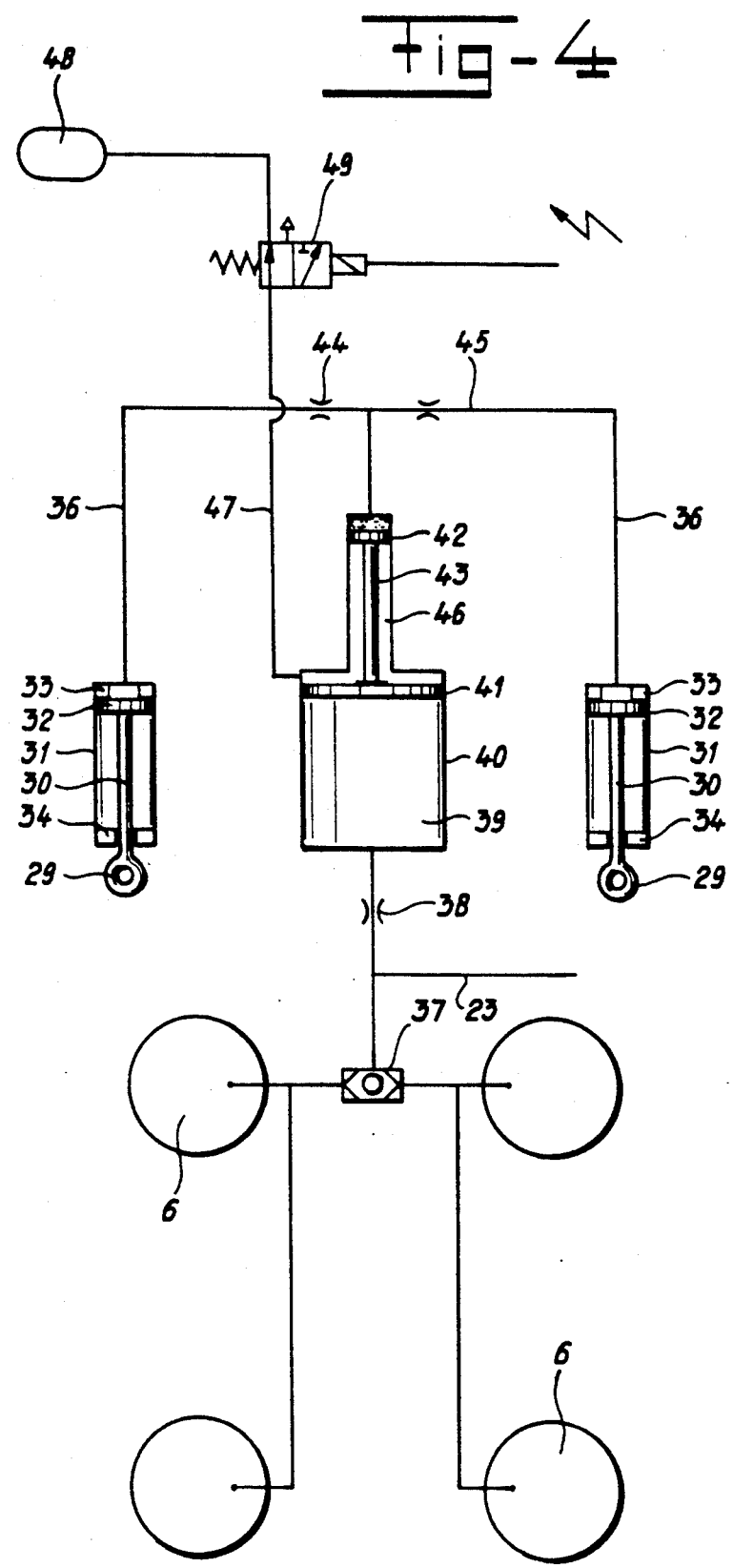
FIG. 4 shows a schematic view of the main parts of the pneumatic/hydraulic system for use in an axle suspension device according to the invention.

A hydraulic/pneumatic control system for such a device is shown schematically by way of example in FIG. 4.

Air is fed into the four bellows 6 from a source for air under pressure (not shown). These bellows are connected, by means of a bilaterally operating non-return valve 37, possibly via a throttling constriction 8, to the space 39 in a pressure transformer 40 in which a piston 41 (or diaphragm) is movable. Said piston 41 is fixed to a much smaller piston 42 (or diaphragm) by means of a rod 43. Oil from the hydraulic system of the cylinders 31 presses on the piston 42, against the pressure of the air from the bellows on piston 41. Throttling constrictions 44 can be provided in the oil pipe 45 to each cylinder 31. An air duct 47 is connected to the space 46 between the pistons 41 and 42, by means of which controllable quantities of air can be admitted from a source 48 of air under pressure through an electrically operated valve 49, the short variable opening time of which determines the quantity of air which is fed to the space 46. This valve 49 is operated depending on desired parameters which one wishes to apply in order to influence the roll rigidity, for example the driving speed, roll accelerations, steering wheel movement and road surface condition. Since the volume of the space 39 below piston 41 is much greater than that of space 46, relatively small quantities of air fed into space 46 will have a relatively great influence on pressure changes therein.

All kinds of parts, ducts, valves etc. used in practice are omitted in FIG. 4, since every expert knows them and knows that they are likely to be used in such a system. For example, a relay valve can be fitted in line 47, which valve very rapidly controls opening and closing thereof for accurately determined, for example also very short time intervals, valve 49 being kept in a certain position for longer periods.

This system works as follows. Air under pressure, for example at a normal working pressure of 8 to 9 bar, is fed to the air bellows through a duct which is not shown. This fairly high air pressure makes small bellows 6 possible, which gives space for other adjacent parts. The air pressure in the bellows can be changed in the known manner depending on load by means of a height regulator, so that the frame is always at the same height relative to the axle, despite differences in load.

The air pressure in the bellows 6 is conveyed by means of the double-acting non-return valve 37 and the constriction 38 to the space 39 in transformer 40, and thus presses on piston 41. By means of the valve 37, pressure changes can be passed on selectively between transformer 40 and bellows 6. The pressure increase in the transformer can be utilized to supply a counter-moment to those bellows which have the highest pressure, which is advantageous for an additional roll suppression. The valve 37 then will automatically take up the correct position. Pressure increases through constriction 38 are also passed on to said space only in throttled condition.

The duct 23 to the shock absorbers 20, if the latter are controlled depending on load, can branch off from the duct in which said constriction 38 is provided, and this as desired from a point either upstream (as shown) or downstream of said constriction. In the former case the shock absorbers react more quickly to pressure increases in the bellows. It can be advantageous to provide two ducts instead of the duct 23, one from the air system of the two lefthand spring bellows 6, and one from that of the righthand spring bellows, each leading to a shock absorber at the same side of the vehicle.

The piston 41 transmits the air pressure in space 39 via the rod 43 to the piston 42, which due to its much smaller surface exerts a much higher pressure on the oil in the pipe system 45, 36 to the hydraulic cylinders 31 of the stabilizer system. A throttling constriction 44 can be provided in duct 45 in every branch thereof.

The roll rigidity is, of course, reduced if the pressure in the intermediary space 46 is increased. Through the control described with pressure change in said intermediary space, a very universal influencing of the roll rigidity can be achieved with a very simple transformer 40 and, for example, ideal driving comfort can be achieved even during straight driving over poor roads; in the case of transverse accelerations the roll rigidity can be increased easily and rapidly by making the pressure in intermediary space 46 drop, and during tipping or far extension of parts such as crane arms and ladders the system can easily be made rigid.

In the arrangement shown, even with heavy rolling, sufficient spring travel always remains in all bellows to maintain full spring comfort in the process.

The further parts of the control system, such as those with a central electronic control unit, are not shown in detail here, since they are universally known per se, and for understanding the invention do not require any further explanation here.

The stabilizer element 15 can project forwards or backwards relative to the axle, as desired depending on all kinds of circumstances such as the vicinity of another axle set, the course of the drive between tandem axles etc. If there are several axles close together, the stabilizer element can extend forwards for one axle and backwards for the other one.

If there is a monocoque body or "space frame", as is often the case in buses, but also in other circumstances, then it can be advisable to fit the stabilizer element 15 above the axle and the rod 11 below it.

We claim:

1. Axle suspension device for a vehicle with spring suspension and with a roll stabilizer with an essentially rigid stabilizer element which in four points is hingedly connected to other parts, in two points to the axle to be stabilized, each near one end thereof, and in two points each with a substantially vertical connection to the vehicle frame which is variable in length under the influence of roll loads, said substantially vertical connections being hydraulic cylinders with piston rods, in which near the place where they come out of the cylinders the piston rods run through a sliding bearing in the cylinders, which bearing can absorb transverse forces, and in which the connections to the frame of the part of these cylinder-piston rod-combinations connected to the frame are rigid.

2. Axle suspension device according to claim 1, in which the stabilizer element lies approximately horizontally essentially below the central axis of the axle to be stabilized, and a reaction rod running in the lengthwise direction of the vehicle is fitted above said central axis, pivoting at one side on the vehicle frame and at the other side on the axle.

3. Axle suspension device according to claim 1, in which the hinge connections between the stabilizer frame and said substantially vertical connections to the frame in rubber cushions or the like permit some movement in all directions.

4. Axle suspension device according to claim 1, in which a yoke projecting forwards and backwards is fitted on the axle at each side, while a gas spring bellows is fitted near each end of each yoke between said yoke and the vehicle frame, and the pivot points of the stabilizer frame with the axle are fitted on said yokes at some distance from a vertical plane through the central axis of the axle, towards the substantially vertical connections.

5. Axle suspension device according to claim 4, in which a shock absorber acts on such a yoke at each side of the vehicle, at the other side of the axle from that at which said pivot points with the stabilizer frame are provided.

6. Axle suspension device according to claim 4, in which the normal average working pressure of the gas in the gas spring bellows is maintained at 750 to 950 kPa.

7. Axle suspension device according to claim 1, in which the gas pressure in the gas spring bellows in a pressure transformer determines the pressure in the hydraulic system to which the above-mentioned hydraulic cylinders are connected.

8. Axle suspension device according to claim 7, in which the gas pressure from the bellows is counteracted in the pressure transformer by the pressure of a fluid medium acting in the opposite direction, which pressure is variable and is under the influence of control means for situation-dependent control.

9. Axle suspension device according to claim 8, in which at the side in which said fluid medium gives a variable counterpressure the pressure transformer has a much smaller volume than at the side of the gas pressure from the bellows.

10. Axle suspension device according to claim 1, in which the hydraulic pressure in said substantially vertical hydraulic cylinders holds the pistons therein against an end stop when no rolling occurs.

11. Axle suspension device according to claim 1, with gas spring suspension, having means for adapting the pressure in the gas springs to the load of the vehicle, for example by means of a height regulation, while a gas pressure derived directly from said pressure in said springs is conveyed to load-dependent shock absorbers for alteration of the damping therein adapted to said load.

12. Vehicle with axle suspension device according to claim 1, in which the rigid connections to the frame of said cylinder-piston rod combinations are fitted against upstanding side walls of beams of the frame.

13. Vehicle according to claim 12, in which the cylinders are fixed to the frame, at such a height that the working stroke of the pistons therein lies essentially at the side of and at the same height as said upstanding side walls.

* * * * *